US010424826B2

United States Patent
Gummalla et al.

(10) Patent No.: US 10,424,826 B2
(45) Date of Patent: Sep. 24, 2019

(54) MULTI-ANTENNA ARRANGEMENTS

(71) Applicant: Google LLC, Mountain View, CA (US)

(72) Inventors: Ajay Chandra Gummalla, Sunnyvale, CA (US); Dieter Statezni, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/977,693

(22) Filed: May 11, 2018

(65) Prior Publication Data

US 2019/0181533 A1 Jun. 13, 2019

Related U.S. Application Data

(60) Provisional application No. 62/597,377, filed on Dec. 11, 2017.

(51) Int. Cl.
| | | |
|---|---|---|
| *H04M 1/00* | (2006.01) | |
| *H01Q 1/22* | (2006.01) | |
| *H01Q 21/28* | (2006.01) | |
| *H01Q 1/24* | (2006.01) | |
| *H04B 7/06* | (2006.01) | |

(52) U.S. Cl.
CPC ........... *H01Q 1/2266* (2013.01); *H01Q 1/241* (2013.01); *H01Q 21/28* (2013.01); *H04B 7/0615* (2013.01)

(58) Field of Classification Search
None
See application file for complete search history.

(56) References Cited

U.S. PATENT DOCUMENTS

| | | | |
|---|---|---|---|
| 6,014,183 A | 1/2000 | Hoang | |
| 7,369,879 B1 | 5/2008 | Steigerwald et al. | |
| 7,751,683 B1 | 7/2010 | Belknap | |
| 9,154,196 B2 * | 10/2015 | Rofougaran | H04B 7/0404 |
| 2015/0091755 A1 | 4/2015 | Chawgo | |
| 2016/0380670 A1 * | 12/2016 | Liu | H01P 1/213 455/73 |

FOREIGN PATENT DOCUMENTS

EP 2940907 11/2015

OTHER PUBLICATIONS

"International Search Report and Written Opinion", PCT Application No. PCT/US2018/046848, dated Nov. 2, 2018, 11 pages.

* cited by examiner

*Primary Examiner* — Erika A Washington
(74) *Attorney, Agent, or Firm* — Colby Nipper PLLC

(57) ABSTRACT

The present disclosure is directed to antenna arrangements. In particular, an arrangement can include at least three antennas. A first and second of the antennas can be positioned such that signals they emit cancel each other out at a physical space comprising a third of the antennas. Additionally or alternatively, an arrangement can include at least two antennas. A first of the antennas can comprise at least two signal-emitting portions positioned such that signals they emit cancel each other out at a physical space comprising a second of the antennas.

20 Claims, 4 Drawing Sheets

MULTI-ANTENNA ARRANGEMENTS

PRIORITY CLAIM

This application claims priority to U.S. Patent Application Ser. No. 62/597,377, filed Dec. 11, 2017, and entitled "MULTI-ANTENNA ARRANGEMENTS," the disclosure of which is incorporated by reference herein in its entirety.

FIELD

The present disclosure relates generally to wireless communications. More particularly, the present disclosure relates to multi-antenna arrangements.

BACKGROUND

People are increasingly utilizing larger numbers of wireless devices (e.g., laptop computers, tablet computers, mobile devices, smartphones, smart-home devices, and/or the like). Many such devices include multiple radios (e.g., configured to operate in accordance with different protocols, and/or the like), which often utilize common or overlapping spectrum. The simultaneous use of multiple radios presents the possibility of interference and a resulting degradation in performance. Some devices address such concerns by configuring the radios to time share, allowing only one radio (e.g., associated with particular spectrum, and/or the like) to communicate at a given time. While a time-sharing approach can prove useful for certain user devices (e.g., laptop computers, smartphones, and/or the like), it often reduces the performance of other devices (e.g., network routers, access points, and/or the like).

SUMMARY

Aspects and advantages of embodiments of the present disclosure will be set forth in part in the following description, or can be learned from the description, or can be learned through practice of the embodiments.

One example aspect of the present disclosure is directed to a method. The method can include transmitting, via first and second antennas of a system, such that signals emitted by the first and second antennas cancel each other out at a physical portion of the system comprising a third antenna of the system. The method can further include communicating, during the transmitting, via the third antenna.

Another example aspect of the present disclosure is directed to a system. The system can include at least two radios, at least three antennas, a signal splitter, and circuitry. A first antenna of the antennas and a second antenna of the antennas can be geometrically positioned such that signals they emit cancel each other out at a physical portion of the system comprising a third antenna of the antennas. The circuitry can be configured to cause the system to: split, via the signal splitter, a signal received from a first radio of the radios into two signals; transmit a first of the two signals via the first antenna; transmit a second of the two signals via the second antenna; and process a signal received, via the third antenna, by a second of the two radios.

Another example aspect of the present disclosure is directed to an antenna arrangement. The arrangement can include at least three antennas. A first and second of the antennas can be positioned such that signals they emit cancel each other out at a physical space comprising a third of the antennas. Additionally or alternatively, the antenna arrangement can include at least two antennas. A first of the antennas can comprise at least two signal-emitting portions positioned such that signals they emit cancel each other out at a physical space comprising a second of the antennas.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
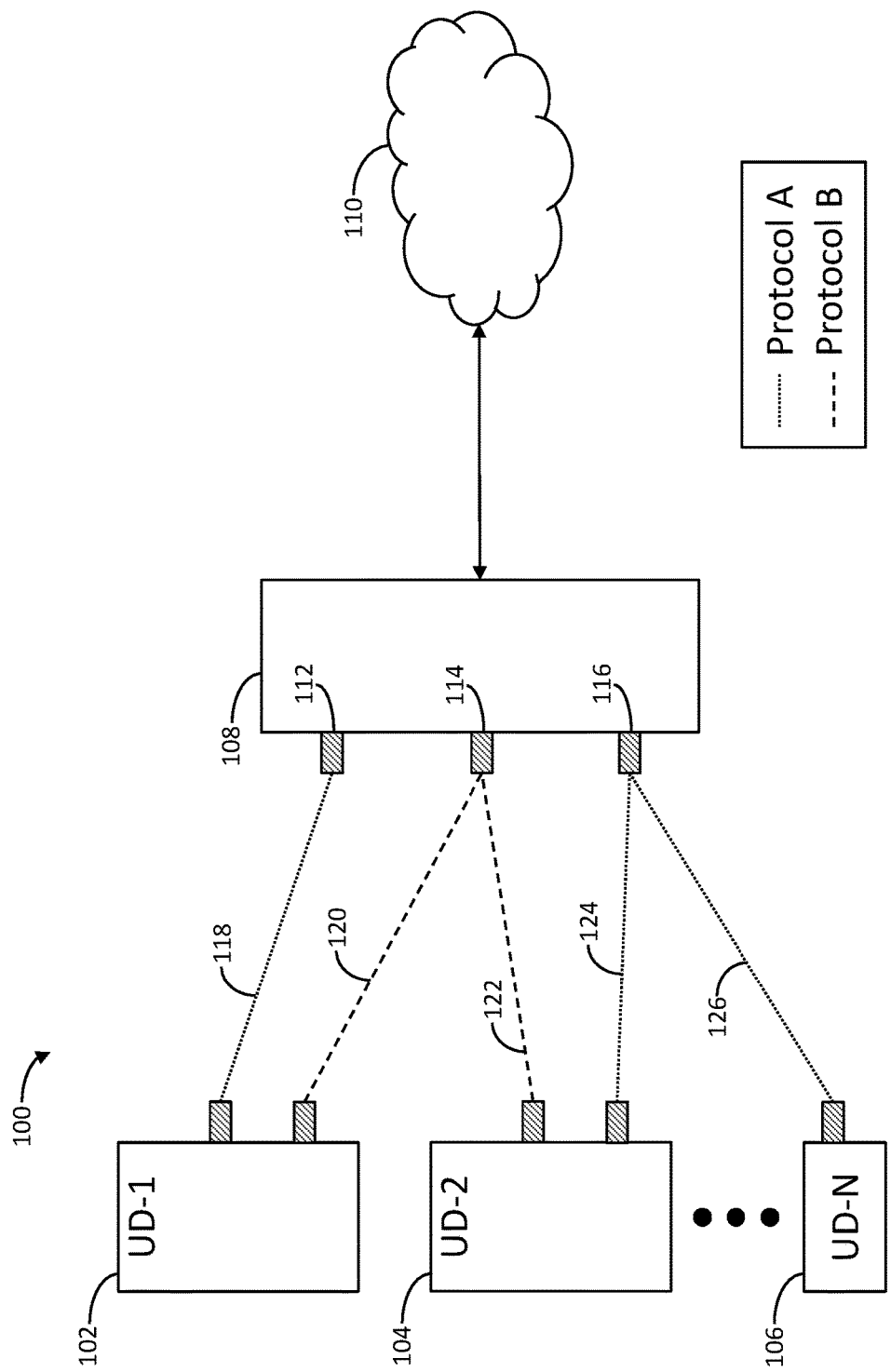
FIG. 1 depicts an example environment according to example embodiments of the present disclosure.

Example aspects of the present disclosure are directed to multi-antenna arrangements. In particular, a system (e.g., a network router, access point, and/or the like) can include an arrangement of at least three antennas and at least two radios. A first of the radios can be configured to communicate (e.g., transmit signals, receive signals, and/or the like) via two of the antennas. For example, the system can include a signal splitter that interfaces the radio with the two antennas. A second of the radios can be configured to communicate (e.g., transmit signals, receive signals, and/or the like) via a different one of the antennas. In accordance with aspects of the disclosure, the two antennas via which the first radio is configured to communicate can be geometrically positioned such that signals they emit cancel each other out at a physical portion of the system where the antenna via which the second radio is configured to communicate is located. Accordingly, the second radio can communicate (e.g., receive a signal, transmit a signal, process a received signal, process a signal to be transmitted, and/or the like) while the first radio is transmitting (e.g., with reduced or no interference from the transmissions of the first radio, and/or the like).

As indicated above, the system can include a signal splitter that interfaces the first radio with two of the antennas. For example, the system can be configured to split (e.g., via the signal splitter, and/or the like) a signal received from the first radio into multiple signals, for example, a signal for each of the antennas. In some embodiments, the system can be configured to apply equal amounts of power to the two antennas with mirrored patterns. The signal splitter can include an isolation resistor, and the system can include a feed from the isolation resistor to a receiver of the second radio and/or a monitor. Accordingly, at least a portion of the signal can be fed (e.g., via the feed, and/or the like) to the receiver of the second radio and/or the monitor. In such embodiments, one or more parameters (e.g., phase, amplitude, and/or the like) of at least one of the signals from the splitter can be adjusted based on the feed (e.g., the at least a portion of the signal, and/or the like), for example, to minimize detection of the signal by the second radio (e.g., via a closed loop created by the feed, and/or the like).

In some embodiments, the radios can be configured to communicate via common (e.g., the same, overlapping, and/or the like) spectrum (e.g., 2.4 GHz, and/or the like). For example, the first radio can be configured to communicate via a first portion of spectrum, the second radio can be configured to communicate via a second portion of spectrum, and the first and second portions of spectrum can overlap at least in part. Additionally or alternatively, the first and second radios can be configured to communicate (e.g., transmit, receive, and/or the like) in accordance with different protocols (e.g., Wi-Fi protocols, Bluetooth protocols, Zigbee protocols, Thread protocols, and/or the like).

In some embodiments, the first radio can communicate (e.g., transmit information destined for, and/or the like) with a device with which the second radio is communicating (e.g., the same device via different protocols, and/or the like). Additionally or alternatively, the radios can communicate with devices that are different and distinct from one another.

The technologies described herein can provide a number of technical effects and benefits. For example, the technologies can reduce or obviate the need to coordinate radios (e.g., firmware, and/or the like) provided by different manufacturers. Additionally or alternatively, airtime need not be shared amongst the radios (e.g., through time division techniques, and/or the like), thereby increasing throughput. For example, the radios can coexist and simultaneously operate within a common (e.g., the same, and/or the like) system without having to coordinate the timing of transmissions. Moreover, the technologies can enhance polarization diversity between the radios, with signal cancellation of one of the radios on the other, while still providing omnidirectional coverage in the antenna pattern.

With reference now to the Figures, example embodiments of the present disclosure will be discussed in further detail.

FIG. 1 depicts an example environment according to example embodiments of the present disclosure. Referring to FIG. 1, environment 100 can include one or more computing devices (e.g., laptop computers, tablet computers, mobile devices, smartphones, smart-home devices, and/or the like). For example, environment 100 can include user devices 102, 104, and 106. Environment 100 can also include system 108 and network 110. System 108 can include one or more devices (e.g., network devices, network routers, access points, hubs, and/or the like) that interface (e.g., via a combination of wireless links, wired links, and/or the like) devices 102, 104, and/or 106 with one another and/or network 110. System 108 can include one or more antennas. For example, system 108 can include antennas 112, 114, and 116. Antennas 112, 114, and/or 116 can support (e.g., by transmitting signals, receiving signals, and/or the like) one or more wireless communication links between system 108 and devices 102, 104, and/or 106. For example, antenna 112 can support link 118 between system 108 and device 102. Similarly, antenna 114 can support link 120 between system 108 and device 102, and link 122 between system 108 and device 104; and antenna 116 can support link 124 between system 108 and device 104, and link 126 between system 108 and device 106. Links 118, 120, 122, 124, and/or 126 can be established and/or communicate in accordance with various protocols (e.g., Wi-Fi protocols, Bluetooth protocols, Zigbee protocols, Thread protocols, and/or the like). For example, links 118, 124, and 126 can utilize a first protocol (e.g., Protocol A), and links 120 and 122 can utilize a second protocol (e.g., Protocol B). Some of such protocols can utilize common (e.g., the same, overlapping, and/or the like) spectrum (e.g., 2.4 GHz, and/or the like). For example, the protocol utilized by links 118, 124, and 126 can utilize a portion of spectrum that overlaps at least in part a portion of spectrum utilized by links 120 and 122.

Figure 2:
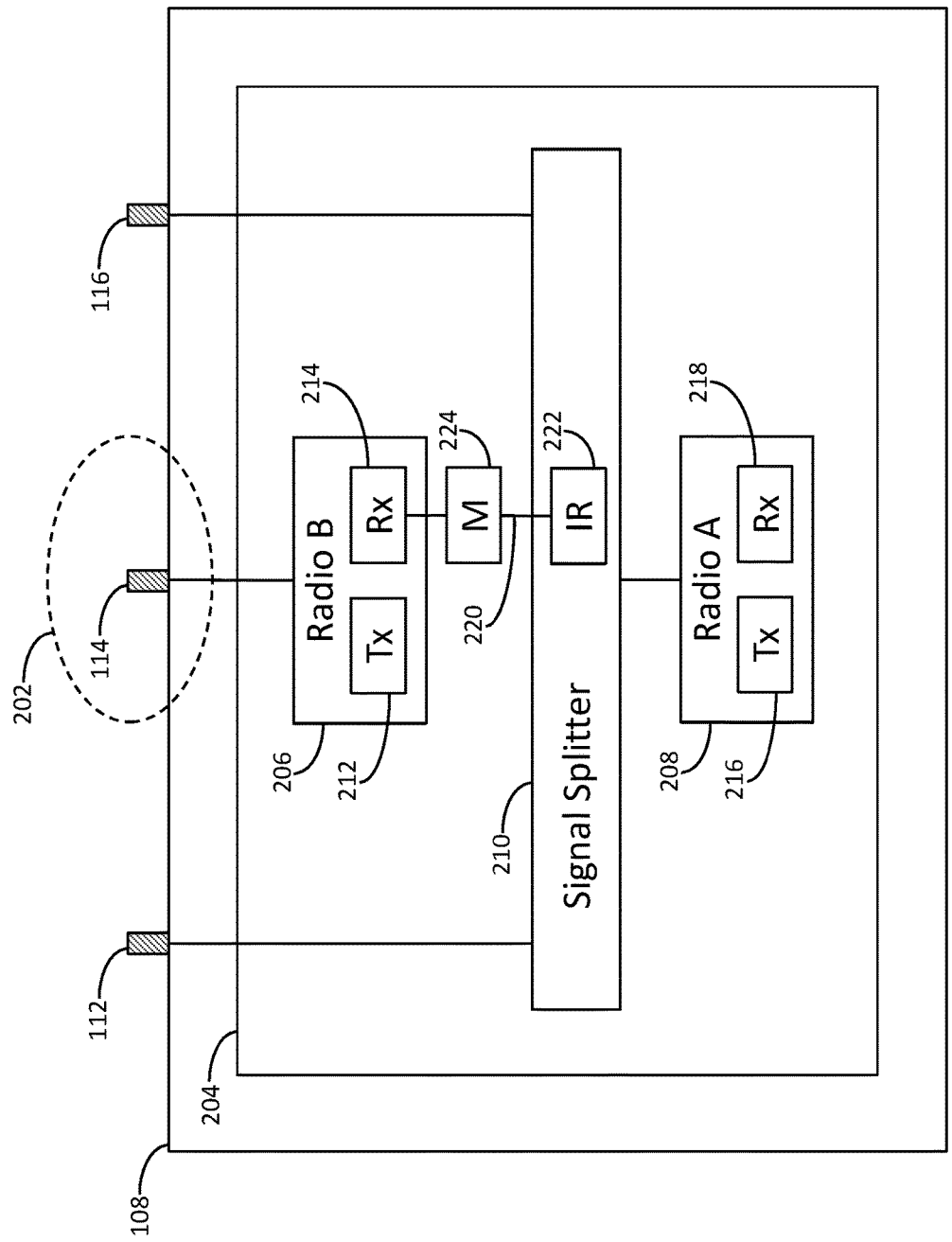
FIG. 2 depicts an example system and an example antenna arrangement according to example embodiments of the present disclosure.

FIG. 2 depicts an example system according to example embodiments of the present disclosure. Referring to FIG. 2, as indicated above system 108 can include antennas 112, 114, and 116. In accordance with aspects of the disclosure, antennas 112 and 116 can be geometrically positioned such that signals they emit cancel each other out at portion 202 of system 108, in which antenna 114 can be located. System 108 can also include circuitry 204. Circuitry 204 can include components, logic, and/or the like configured to perform one or more functions, operations, and/or the like described herein. For example, circuitry 204 can comprise, interface, and/or the like radios 206 and 208 and signal splitter 210. Radio 206 can include transmitter 212 and receiver 214 and can be configured to utilize antenna 114 to support communications (e.g., associated with links 120, 122, and/or the like) in accordance with a particular protocol (e.g., Protocol B). Similarly, radio 208 can include transmitter 216 and receiver 218 and can be configured to utilize antennas 112 and/or 116 to support communications (e.g., associated with links 118, 124, 126, and/or the like) in accordance with a different protocol (e.g., Protocol A). For example, signal splitter 210 can be configured to split a signal received from radio 208 (e.g., from transmitter 216, and/or the like) into two signals: a signal to be transmitted via antenna 112, and a signal to be transmitted via antenna 116. In some embodiments, system 108 can be configured to apply equal amounts of power to antennas 112 and 116 with mirrored patterns. Signal splitter 210 can include isolation resistor 222, and system 108 can include feed 220 from isolation resistor 222 to receiver 214 and/or monitor 224.

It will be appreciated that, in some embodiments, radio 208 can comprise signal splitter 210 and/or be configured to perform one or more functions and/or operations attributed herein to signal splitter 210. It will be further appreciated that system 108 can comprise additional antennas and/or radios. Such antennas could include antennas configured in accordance with aspects of the disclosure. For example, system 108 could include one or more additional pairs of antennas (e.g., associated with radio 208, an additional radio, and/or the like) such that signals they emit cancel each other out at portion 202 of system 108 and/or at a different portion of system 108 comprising an additional antenna (e.g., associated with radio 206, an additional radio, and/or the like). Similarly, portion 202 of system 108 can comprise one or more additional antennas (e.g., associated with radio 206, an additional radio, and/or the like).

Figure 3:
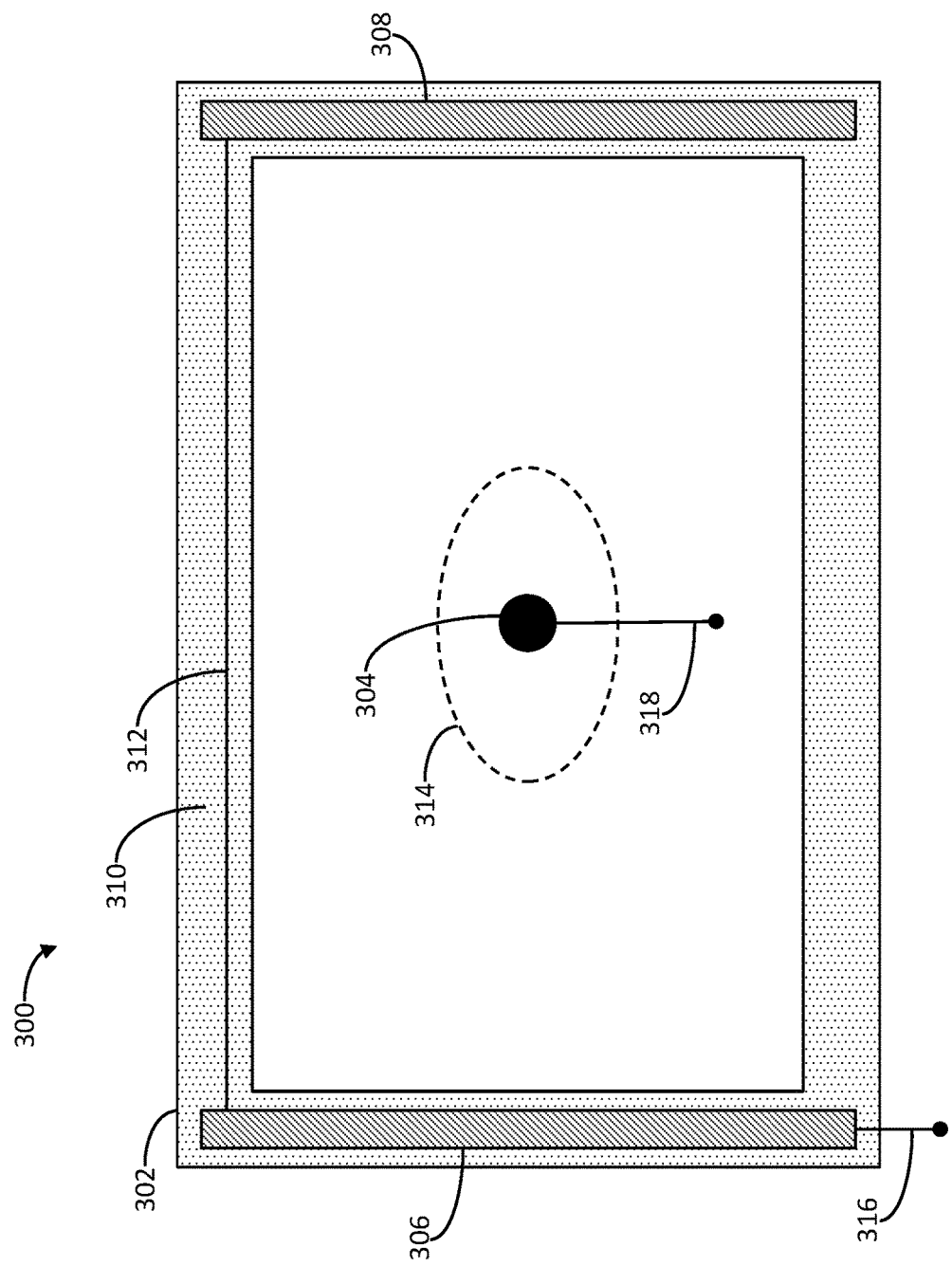
FIG. 3 depicts an additional example antenna arrangement according to example embodiments of the present disclosure.

FIG. 3 depicts an additional example antenna arrangement according to example embodiments of the present disclosure. Referring to FIG. 3, arrangement 300 can include antennas 302 and 304. Antenna 302 can include signal-emitting portions 306 and 308. Antenna 302 can also include portion 310, which can isolate portions 306 and 308 from one another. Antenna 302 can further include element 312, which can interface portions 306 and 308. In accordance with aspects of the disclosure, portions 306 and 308 can be positioned such that signals they emit cancel each other out at physical space 314, in which antenna 304 can be located. Lead 316 can interface antenna 302 with radio 208 and/or the like. Lead 318 can interface antenna 304 with radio 206 and/or the like. It will be appreciated that a system such as system 108 can include an arrangement such as arrangement 300 in addition to or in lieu of antennas 112, 114, and/or 116.

Figure 4:
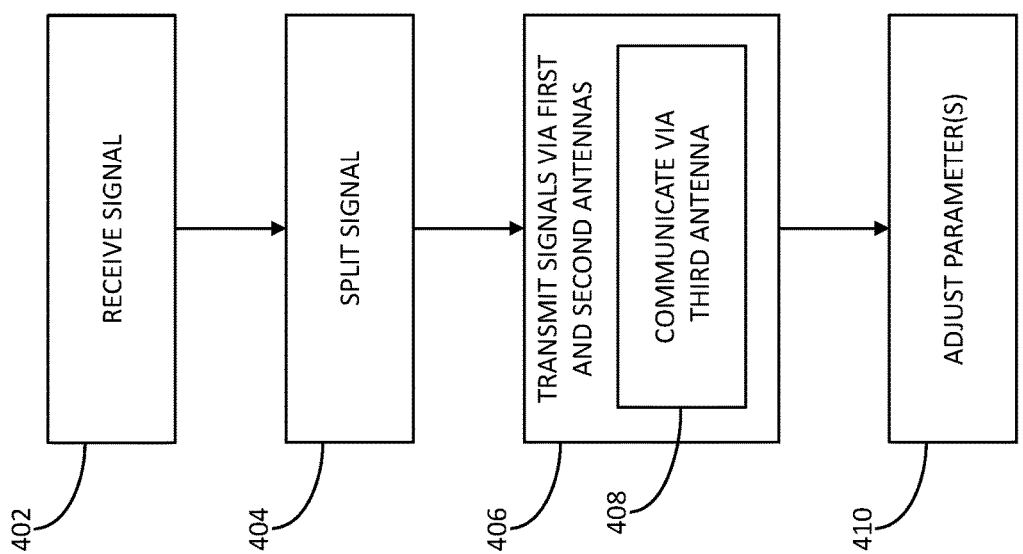
FIG. 4 depicts an example method according to example embodiments of the present disclosure.

FIG. 4 depicts an example method according to example embodiments of the present disclosure. Referring to FIG. 4, at (402), a signal can be received from a first radio of the system. For example, signal splitter 210 can receive a signal (e.g., associated with links 118, 124, 126, and/or the like) from radio 208 (e.g., transmitter 216, and/or the like). At (404), the signal can be split. For example, signal splitter 210 can split the signal received from radio 208 into two signals: a signal for transmission via antenna 112, and a signal for transmission via antenna 116. At (406), the signals can be transmitted. For example, one of the signals from signal splitter 210 can be transmitted via antenna 112, and another of the signals from signal splitter 210 can be transmitted via antenna 116. At (408), during the transmitting of (406), a second radio of the system can communicate via an antenna located in a physical space of the system where the signals emitted in association with the transmitting are canceling each other out. For example, while radio 208 is transmitting via antennas 112 and 116, radio 206 can communicate (e.g., in association with links 120, 122, and/or the like) via antenna 114. At (410), one or more parameters (e.g., phase, amplitude, and/or the like) of at least one of the signals being transmitted can be adjusted. For example, system 108 can adjust (e.g., based on at least a portion of the signal fed via feed 220, and/or the like) one or more parameters of the signal being transmitted via antenna 112 and/or the signal being transmitted via antenna 116, for example, to minimize detection of the signal by radio 206 (e.g., via a closed loop created by feed 220, and/or the like). Accordingly, the typical isolation between antennas 112, 114, and/or 116 can be increased significantly enough (e.g., to a sufficient level, and/or the like) to reduce interference between radios 206 and 208 (e.g., even when they are operating simultaneously).

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A method comprising:
splitting a signal, received from a radio of a system, into signals;
feeding, from an isolation resistor of a signal splitter, at least a portion of the signal;
transmitting, via first and second antennas of the system, such that signals emitted by the first and second antennas cancel each other out at a physical portion of the system comprising a third antenna of the system; and
communicating, during the transmitting, via the third antenna.

2. The method of claim 1, wherein the communicating comprises receiving a signal via the third antenna.

3. The method of claim 1, wherein the communicating comprises transmitting a signal via the third antenna.

4. The method of claim 1, wherein:
the transmitting comprises transmitting within a first portion of spectrum;
the communicating comprises one or more of receiving or transmitting within a second portion of the spectrum; and
the first portion of the spectrum and the second portion of the spectrum overlap at least in part.

5. The method of claim 1, wherein:
the transmitting comprises transmitting in accordance with a first protocol;
the communicating comprises communicating in accordance with a second protocol; and
the first protocol and the second protocol are different.

6. The method of claim 5, wherein the first protocol and the second protocol comprise one or more of a Wi-Fi protocol, a Bluetooth protocol, a Zigbee protocol, or a Thread protocol.

7. The method of claim 1, wherein:
the transmitting comprises transmitting information destined for a first device;
the communicating comprises communicating with a second device; and
the first device and the second device are different and distinct devices.

8. The method of claim 1, wherein the transmitting comprises transmitting information destined for a device with which the system is communicating via the third antenna.

9. The method of claim 1, wherein the transmitting comprises applying equal amounts of power to the first and second antennas with mirrored patterns.

10. The method of claim 1, wherein:
the splitting comprises, splitting, via a signal splitter of the system, the signal, received from the radio, into the signals; and
the communicating comprises communicating via a different radio of the system.

11. The method of claim 10, comprising, adjusting, based on the at least a portion of the signal, one or more parameters of at least one of the signals.

12. A system comprising:
at least two radios;
at least three antennas, wherein a first antenna of the antennas and a second antenna of the antennas are geometrically positioned such that signals they emit cancel each other out at a physical portion of the system comprising a third antenna of the antennas; and
circuitry configured to cause the system to:
split a signal, received from a first radio of the radios, into two signals;
transmit a first of the two signals via the first antenna;
transmit a second of the two signals via the second antenna;
provide a feed from an isolation resistor; and
process a signal received, via the third antenna, by a second radio of the at least two radios.

13. The system of claim 12, wherein:
the first radio and the second radio are configured to communicate at least in part via common spectrum;
the first radio is configured to communicate in accordance with a first protocol;
the second radio is configured to communicate in accordance with a second protocol; and
the first protocol and the second protocol are different.

14. The system of claim 12, wherein the system is configured to apply equal amounts of power to the first antenna and the second antenna with mirrored patterns.

15. The system of claim 12, the circuitry comprising:
a signal splitter configured to split the signal, received from the first radio of the radios, into the two signals, the signal splitter including the feed from the isolation resistor.

16. The system of claim 12, wherein the circuitry is configured to cause the system to adjust, based on the feed, one or more parameters of at least one of the two signals.

17. An electronic device comprising:
at least two radios;
at least three antennas, a first antenna of the antennas and a second antenna of the antennas being geometrically positioned such that signals they emit cancel each other out at a physical portion of the electronic device including a third antenna of the at least three antennas;
a signal splitter including an isolation resistor and configured to split a signal received from a first radio of the at least two radios, into two signals; and
circuitry configured to cause the electronic device to:
transmit a first of the two signals via the first antenna;
transmit a second of the two signals via the second antenna;
provide a feed from the isolation resistor; and
process a signal received, via the third antenna, by a second radio of the at least two radios.

18. The electronic device of claim 17, wherein:
the first radio is configured to communicate in accordance with a first protocol;
the second radio is configured to communicate in accordance with a second protocol; and
the first protocol and the second protocol are different.

19. The electronic device of claim 18, wherein the first protocol and the second protocol comprise one or more of a Wi-Fi protocol, a Bluetooth protocol, a Zigbee protocol, or a Thread protocol.

20. The electronic device of claim 17, wherein the first radio and the second radio are configured to communicate at least in part via common spectrum.

* * * * *